INVENTORS.
CLAIRE G. BALL,
ARTHUR C. GRIMM &
THOMAS MELVILLE

FLAT y = 361.25 + 55.50x
WHERE (0 < x < 10)

ROUND y = 429.34 + 18.06x
WHERE (0 < x < 15)

INVENTORS.
CLAIRE G. BALL, ARTHUR C. GRIMM &
THOMAS MELVILLE

INVENTORS.
CLAIRE G. BALL,
ARTHUR C. GRIMM &
THOMAS MELVILLE

April 17, 1973  C. G. BALL ET AL  3,728,211
REINFORCED COMPOSITE

Original Filed April 16, 1970  5 Sheets-Sheet 4

INVENTORS.
CLAIRE G. BALL,
ARTHUR C. GRIMM &
THOMAS MELVILLE

By

Attorney

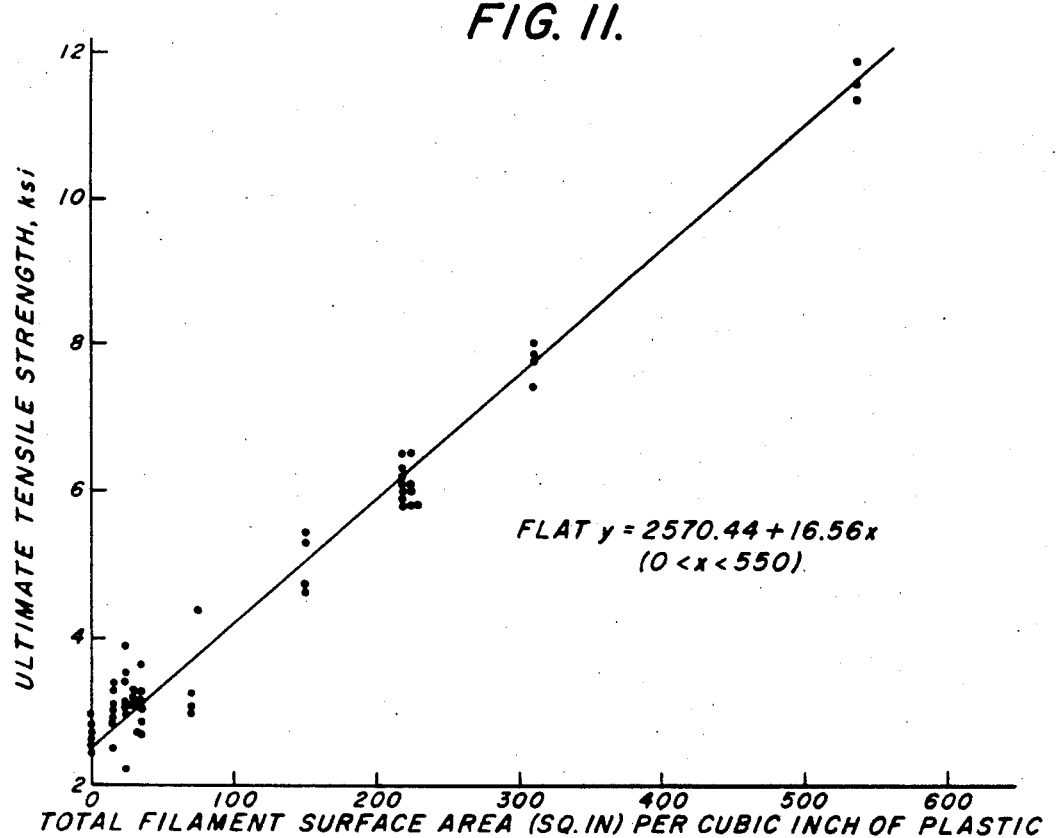
FIG. 11.
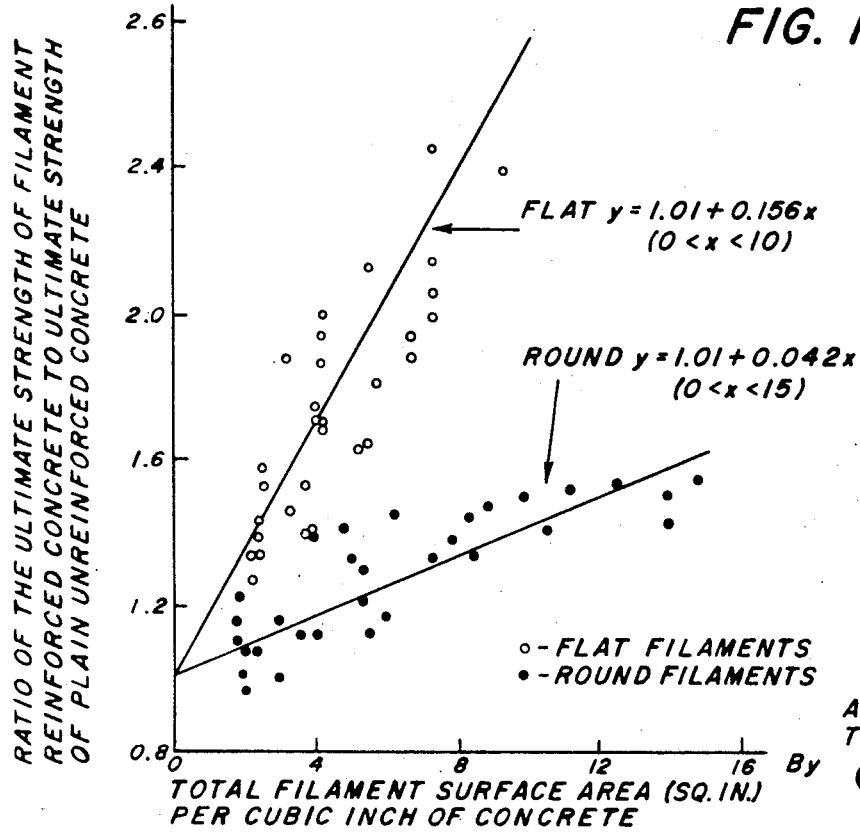
FIG. 12.
INVENTORS.
CLAIRE G. BALL,
ARTHUR C. GRIMM &
THOMAS MELVILLE
Attorney

United States Patent Office 3,728,211
Patented Apr. 17, 1973

3,728,211
REINFORCED COMPOSITE
Claire G. Ball, Wheeling, Ill., and Arthur C. Grimm, Bellevue Borough, and Thomas Melville, Unity Township, Westmoreland County, Pa., assignors to United States Steel Corporation
Application Apr. 16, 1970, Ser. No. 29,211, now Patent No. 3,650,785, which is a continuation-in-part of abandoned application Ser. No. 663,315, Aug. 25, 1967. Divided and this application Aug. 30, 1971, Ser. No. 176,159
Int. Cl. B32b 5/16; D04h 1/00
U.S. Cl. 161—170
2 Claims

ABSTRACT OF THE DISCLOSURE

A reinforced composite of a castable matrix having discontinuous reinforcing filaments randomly distributed within the martix which reinforce the matrix and which are bonded to the matrix chemically and/or mechanically. The filaments have a non-round cross sectional configuration with width and thickness dimensions and with a width-to-thickness ratio of not greater than about five. For maximum reinforcing strength, the filaments should have an ultimate tensile strength at least equal to the average tensile stress developed in the filament at bond failure. The characteristics of the filaments are such as to permit dry admixing with the castable matrix material. A method of making the reinforced composite and apparatus for and a method of coating the filaments are disclosed.

---

This application is a divisional application of U.S. patent application Ser. No. 29,211 filed Apr. 16, 1970 now U.S. Pat. 3,650,785, which application is in turn a continuation-in-part application of U.S. application Ser. No. 663,315 filed Aug. 25, 1967 by applicants and now abandoned, all applications being assigned to the same assignee.

BACKGROUND OF THE INVENTION

This invention relates to reinforcing a castable mass. More particularly, the invention concerns reinforcing a castable matrix of a material such as concrete to form a composite having improved tensile strength and other physical properties.

Reinforcement of castable materials, e.g. plastics, rubber, refractories, asphalt, concrete, etc. to increase the mechanical properties such as tensile strength and/or resistance to crack propagation, has long been desired. In particular, concrete reinforcement, for example, has been in the form of bars and rods placed in forms before concrete pouring, as well as in the use of filaments and fibers of various materials added to the concrete during mixing, pouring, or before setting. The latter have been provided both as uniformly disposed reinforcing as well as in random distribution.

Recently, attention has been directed to the use of short, round filaments, i.e. steel wire, as reinforcing, and several patents (Belgian Pat. No. 559,422 and U.S. Pats. Nos. 2,677,955, 3,062,670 and 3,231,341) have been granted for same. It has been suggested that such filaments be employed in random orientation, and some recent investigators have attributed importance to the spacing of the filaments. Obviously, however, critical spacing cannot be accurately measured and can be determined only by theoretical calculations, taking into consideration the relative quantities of reinforcing filaments and matrix volume. It has been clearly demonstrated that round filament reinforcing can accomplish a significant increase in the tensile strength and resistance to crack propagation of a matrix such as concrete and improvement in other properties as well.

SUMMARY OF THE INVENTION

The present invention involves the discovery that certain filament configurations result in an increase in strength disproportionately greater than previously used filament forms. Furthermore, it has been discovered that other factors than filament spacing are more accurate reflections of the increase in strength achievable by reinforcing with filaments. A part of the invention is the discovery that the strength improvement is related to the total surface area of the reinforcing filaments. Round filaments do not have as much surface area as non-round, i.e. rectangular or flat, filaments of the same cross-sectional area. The geometric surface relationship between round and rectangular cross sections, for example, of equal cross-sectional area, is such that a minimum of 12.8% increase in surface area exists with the non-round filaments. This 12.8% increase is with respect to a square cross section for a width-to-thickness ratio of one. Thus, increasing the total surface area for a given quantity, i.e. weight of filaments/unit volume of matrix, can be accomplished by decreasing the width-to-thickness ratio of the filaments used for reinforcing. A decrease in the width-to-thickness ratio will result in higher strength of the reinforced composite since the reason for the strength increase is that the total surface area is increased while the quantity of filaments, i.e. weight of filaments/unit volume of matrix, remains the same. In accordance with the invention, discontinuous non-round reinforcing filaments with a width-to-thickness ratio (R) of not greater than about five are used to reinforce a castable matrix. The terms "non-round" and "round" filaments or fibers as used herein refer to the cross section of the filament without regard to filament length. Thus, "round" filaments are those with circular cross section, usually made of cut wire lengths, and "non-round" filaments are those having definite width and thickness dimensions, albeit that the thickness for usual "flat" filaments may be measured in thousandths of an inch.

In more specific terms, it has been found that the addition of equivalent weights of round and non-round filaments of equivalent cross-sectional area/cubic foot of concrete mortar results in an increase in the tensile strength of the concrete with non-round filaments of about twice that achieved by the round filaments. Thus, for the same weight of filaments, non-round, i.e. flat filaments, are disproportionately more effective in strengthening a matrix than are round filaments. As a corrollary, equivalent strength increase can be achieved with less (lb./ft.³) of non-round filaments than round filaments. The term "mortar" as used herein refers to a mixture of fine aggregate, water and cement. When the term "concrete" is used, it refers to mortar which may contain coarse aggregate. The term "matrix" refers broadly to moldable materials.

In order to utilize the ability of the filaments to strengthen a matrix, the filaments (1) must be chemically and/or mechanically bonded to the matrix, and (2) should have an ultimate tensile strength at least equal to the average tensile stress developed in the filament at bond failure. By providing filaments of greater surface area, the total bonding force can be improved and with it the potential strength improvement in the matrix. However, we have found, as will be hereinafter discussed, that a total surface area which will be provided by filaments with a width-to-thickness ratio of up to five will provide considerably more improvement in strength than filaments with width-to-thickness ratios larger than five. The average tensile stress ($T_s$) developed in a non-round filament, which in accordance with the invention has width and thickness dimensions, can be determined from the equation below. It should be noted that the filaments may be cambered, crimped or twisted and that the term "width" is used broadly, since in the case of cambered filaments, for example, the "width" would be the circumferential length.

Average tensile stress $T_s = U_t \left(\dfrac{L}{2t}\right)\left(\dfrac{R+1}{R}\right)$ where:

$T_s$ = average tensile stress in a non-round filament;
$U_t$ = average bond stress developed in a filament;
L = length of the filament;
t = thickness of the filament; and
R = width-to-thickness ratio of the filament.

The average bond stress, $U_t$ depends on:

(A) the strength properties of the matrix;
(B) configuration of the filaments;
(C) surface condition of the filaments; and
(D) any coating added to the filaments to enhance bond.

As stated above, and as will be made more apparent, the characteristics of filaments used in accordance with the invention are such as to permit their utilization and mixing with matrix material in a substantially dry state. Thus, in accordance with one embodiment of the invention, there is provided a method of making a reinforced composite, such as of concrete, which comprises preparing a substantially dry admixture of cement, aggregate and a plurality of discontinuous reinforcing filaments having a non-round configuration, width and thickness dimensions, and a width-to-thickness ratio of not greater than about five. The substantially dry admixture is adequately mixed to randomly distribute the reinforcing filaments and is then ready for the addition of water to hydrate the cement after which it is remixed. It is understood that additives such as air entraining agents, plasticizers, bond enhancers, etc. may be added, if desired, and their addition is within the purview of the invention.

BRIEF DESCRIPTION OF THE SEVERAL VIEWS OF THE DRAWINGS

The invention may be more fully understood by reference to the accompanying drawings and following examples. In the drawings:

FIG. 11 is a graph of the data showing the relationship between ultimate tensile strength and total filament surface area for non-round steel filaments in a plastic matrix, the data for which is round in Table VIII; and FIG. 12 is a graph of the data shown in Tables V-A and VI which shows the relationship between the total filament surface area and the ratio of the strength of a filament reinforced matrix to the strength of a plain matrix.

DETAILED DESCRIPTION

Figure 1:
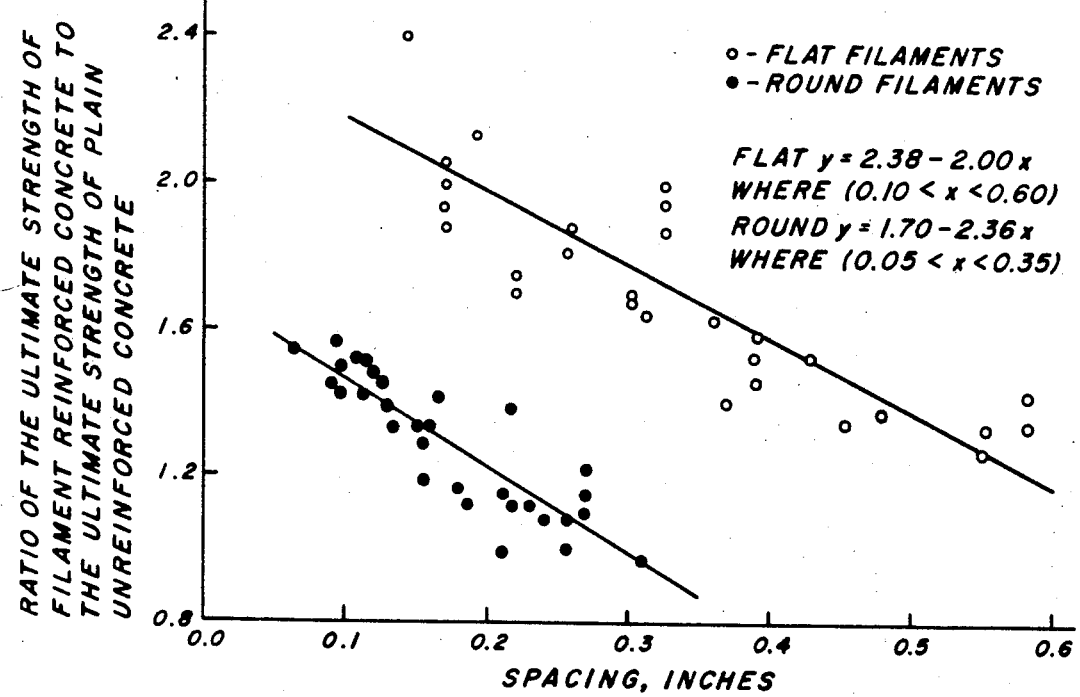
FIG. 1 is a graph comparing the strengthening effect on mortar of both round and non-round fibers as a function of filament spacing, the data for which is found in Tables V-A and VI.

It will be evident from the ensuing discussion taken in conjunction with the aforementioned graphs that for a given calculated spacing, a non-round filament increases the strength of a matrix to a greater degree than round filaments of equivalent weight. Calculations for spacing of the filaments as used herein are made according to the following equations.

General equation:
$$S = 15.6\sqrt{A/p}$$

Round wire filaments:
$$S = 13.8\sqrt{d^2/p}$$

Non-round-steel filaments:
$$S = 15.6\sqrt{wt/p}$$

where:

S = average filament spacing;
A = cross-sectional area of a filament;
p = filament density in percent by volume of mortar;
d = filament diameter;
w = filament width; and
t = filament thickness.

The strengthening effect of the filament on the matrix depends on bond stress and the total surface area of the filaments. Of course, the most desirable condition is to develop as large a bond force as possible and to this end, coated filaments are within the purview of the invention. Coating, such as epoxy resins and others, may therefore be used.

In summary, there is provided, in accordance with the invention, a reinforced composite of a moldable matrix, of a material such as concrete, and non-round discontinous, i.e. short, filaments having a width-to-thickness ratio of not greater than about five. The filaments must be chemically and/or mechanically bonded to the matrix, and in accordance with the invention, comprise substantially the sole form of discontinuous elements used in the matrix, although the non-round filaments may be used together with other forms of continuous reinforcing such as bars, mesh, etc. Also in accordance with the invention, filaments from 0.005 to 0.15-inch width, 0.001 to 0.03-inch thickness and ¼ to 3-inches length are used. In addition, it is preferred to use filaments having an ultimate tensile strength of at least 50,000 p.s.i., advantageously of steel, coated or uncoated.

The improvement obtained by practicing the invention is illustrated by a number of examples in which non-round steel filaments were mixed into a mortar consisting of Type IA cement, No. 5 mesh foundry sand and water in the ratio of 1.00:2.43:0.55 by weight. The filaments used in these examples were of steel and of the size described in Tables I and II. Although the filaments in the examples were added to the mortar toward the end of the mixing cycle, they may be alternatively premixed with cement and/or the sand, i.e. fine aggregate (and coarse aggregate if desired).

Fiber-reinforced mortar as described above was cast in waxed-cardboard molds, 6-inches in diameter and 12-inches in height. Controlled samples (specimens) of plain mortar were also cast. All specimens were removed from the molds after 24-hours and placed in a moist-cure room for 28 days. An indirect tension test described in ASTM C 496–64T was used to determine the tensile strength of the specimens. The tensile strength in p.s.i. is expressed as:

$$T_s = 2P/\pi DL$$

where:

P = ultimate load sustained by specimen;
D = diameter of cylindrical specimen; and
L = length of cylindrical specimen.

The results of a number of tests conducted as described above are given in Tables I and II. The data in Tables I and II are representative of the data used to plot the curves of FIGS. 1 and 2. In the tables, Table I reports the results of tests using round-reinforcing filaments and Table II non-round or flat filaments in accordance with the invention. Both tables report the percentage by volume of filaments in the mortar, calculated spacing and ultimate stress in p.s.i. observed by indirect tension testing.

TABLE I
Round filaments

| Diameter, inch | Percentage steel by volume of concrete | Spacing, inch | Ultimate p.s.i. | Fig. 1 ratio p.s.i./426 |
|---|---|---|---|---|
| 0.017 | 6.25 | 0.094 | 664 | 1.56 |
| 0.017 | 4.16 | 0.115 | 643 | 1.51 |
| 0.017 | 2.04 | 0.164 | 602 | 1.41 |
| 0.025 | 2.50 | 0.218 | 634 | 1.49 |
| 0.017 | 0.76 | 0.269 | 467 | 1.10 |
| 0.017 | 0.76 | 0.269 | 491 | 1.15 |
| 0.025 | 1.25 | 0.309 | 414 | 0.97 |
| Plain mortar | | | ¹ 426 | |

¹ Average.

TABLE II
Flat filaments

| Thickness, inch | Width, inch | Percentage steel by volume of concrete | Spacing, inch | Ultimate stress, p.s.i. | Fig. 1 ratio p.s.i./356 |
|---|---|---|---|---|---|
| 0.014 | 0.030 | 3.5 | 0.171 | 765 | 2.15 |
| 0.014 | 0.030 | 1.5 | 0.261 | 669 | 1.88 |
| 0.015 | 0.063 | 2.5 | 0.304 | 602 | 1.69 |
| 0.015 | 0.063 | 1.5 | 0.392 | 558 | 1.57 |
| 0.015 | 0.125 | 2.5 | 0.428 | 545 | 1.53 |
| 0.014 | 0.150 | 2.5 | 0.454 | 481 | 1.35 |
| 0.014 | 0.150 | 1.5 | 0.584 | 478 | 1.34 |
| Plain mortar | | | | ¹ 356 | |

¹ Average.

Figure 2:
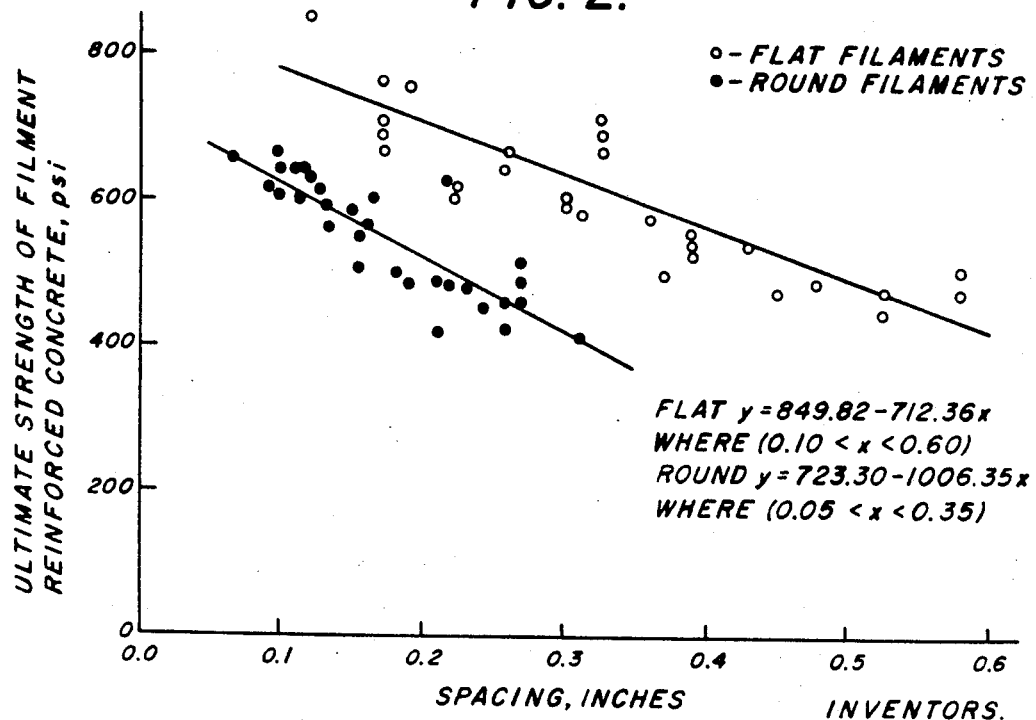
FIG. 2 is a graph illustrating results similar to those shown in FIG. 1 except that the actual tensile strength values are used rather than strength ratios, the data for which is found in Tables V-A and VI.

As can be seen from graphs of FIGS. 1 and 2, non-round fibers provide a greater improvement in strength than round wire of equivalent weight at equivalent calculated filament spacing conditions. This result is completely unexpected and contrary to conclusions based on the results obtained by earlier investigators.

We have discovered that a more accurate correlation with strength exists between total surface area of the filaments. This relationship is illustrated by a number of examples in which indirect tension tests on mortar reinforced with round and non-round fibers were conducted with a number of specimens reinforced with either round or non-round fibers. The results of these tests are shown graphically in FIGS. 3 and 4 which plot ultimate strength in p.s.i. against total fiber surface area/cubic inch of concrete. These curves show the results of indirect tension tests referred to above and are a statistical plotting of a great number of test specimens. The round-fiber curve represents the results of testing fibers of electro-brass plated wires having a nominal tensile strength of 240,000 p.s.i. and having the dimensions listed in Table III.

TABLE III
Wire fibers tested

| | Diameter, inch | Length, inch |
|---|---|---|
| I | 0.0065 | ⅜ |
| | 0.0065 | ½ |
| II | 0.017 | ⅜ |
| | 0.017 | ½ |
| | 0.017 | ⅝ |
| III | 0.017 | 1½ |
| | 0.025 | ⅝ |
| | 0.025 | 1½ |

The non-round-fiber curve represents results on cut sheet steel having a nominal tensile strength of about 55,000 p.s.i. and having dimensions listed in Table IV.

TABLE IV
Flat fibers tested

| | Thickness, inch | Width, inch | Length, inch |
|---|---|---|---|
| I | 0.010 | 0.022 | 1 |
| | 0.010 | 0.030 | 1½ |
| | 0.010 | 0.094 | 1 |
| | 0.014 | 0.208 | 1 |
| II | 0.014 | 0.030 | 1 |
| | 0.014 | 0.050 | 1 |
| | 0.014 | 0.081 | 1 |
| | 0.014 | 0.150 | 1 |
| | 0.015 | 0.063 | 1 |
| III | 0.015 | 0.094 | 1 |
| | 0.015 | 0.125 | 1 |

As mentioned above, the straight-line curve shown in FIGS. 3 and 4 are statistical plottings which clearly demonstrate that strength is directly proportional to the total surface area of the fibers in a unit volume of concrete rather than filament spacing as previously believed. The calculations of the total surface area for these fibers were made with the following equations.

Total surface area:

$$S_t = S_{Af} N$$

where: $S_{Af}$ = surface area of single fiber which for rounds is:

$$\pi dL$$

where:

d = diameter of fiber; and
L = length of fiber and for non-rounds is:

$$2(w+t)L$$

where:

w = width of fiber;
t = thickness of fiber;
L = length of fiber; and
R = width-to-thickness ratio.

N is the number of fibers in a unit volume of concrete $V_c$:

$$N = pV_c / 100 V_{sf}$$

where:

p = percent of filaments (steel) in concrete by volume (decimally p/100);
$V_c$ = volume of a concrete (a unit volume = 1); and
$V_{sf}$ = volume of a single fiber.

$V_{sf}$ for rounds is:

$$\pi d^2 L / 4$$

$V_{sf}$ for non-rounds is:

$$w \cdot t \cdot L$$

Therefore, total surface area for rounds:

$$S_t = S_{Af} N$$
$$= \pi dL p V_c / 100 V_{sf}$$
$$= \pi dL p \times 1 / 100 \pi d^2 L / 4$$
$$= p / 25d$$

and the total surface area for non-rounds:

$$S_t = S_{At}N$$
$$= 2(w+t)LpV_c/100V_{st}$$
$$= 2(w+t)LpV_c/100wtL$$
$$= p(w+t)/50wt$$
$$R = w/t$$

Therefore:

$$S_t = \frac{p}{50t}\left(\frac{R+1}{R}\right)$$

Figure 3:
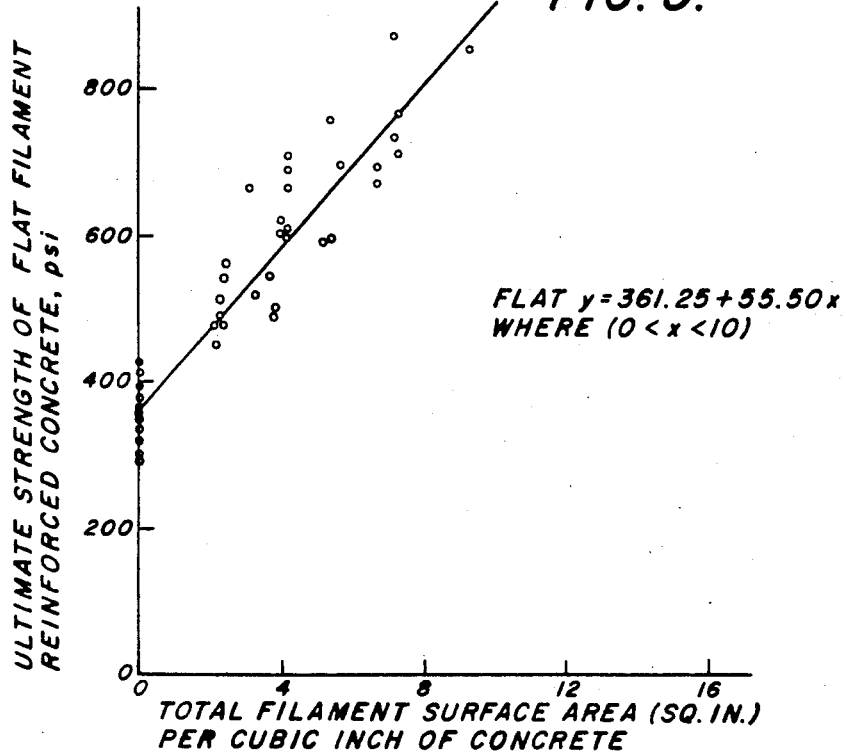
FIGS. 3 and 4 are graphs showing the relationship between ultimate tensile strength and total filament surface area for non-round and round filaments, respectively, the data for which is found in Tables V-A, VI, and VII.
Figure 4:
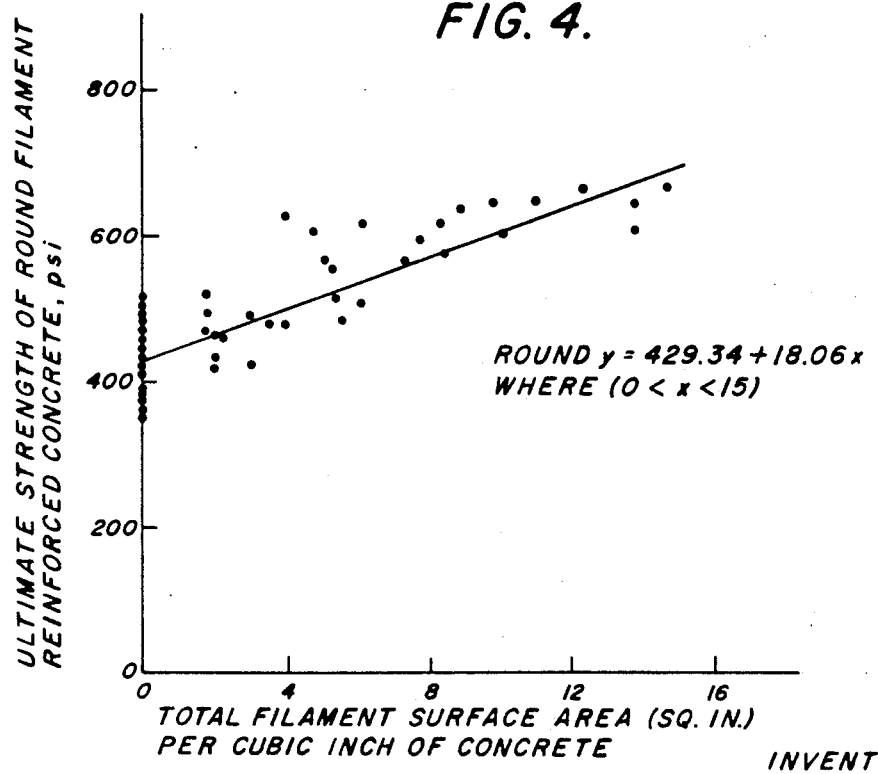

Theoretically, if the inherent bond characteristcis are assumed the same for both round and non-round fiber surfaces, the two curves should be alike because the strength vs. total surface area is equated. It can be seen, however, that the slope of the round filament curve is 18.06 p.s.i./square inch of surface area (FIG. 4), while the slope for the flat or non-round fiber is 55.50 p.s.i./square inch (FIG. 3). It can be concluded, therefore, that the inherent bond characteristic of the non-round fiber is considerably greater than for the round fiber.

Figure 5:
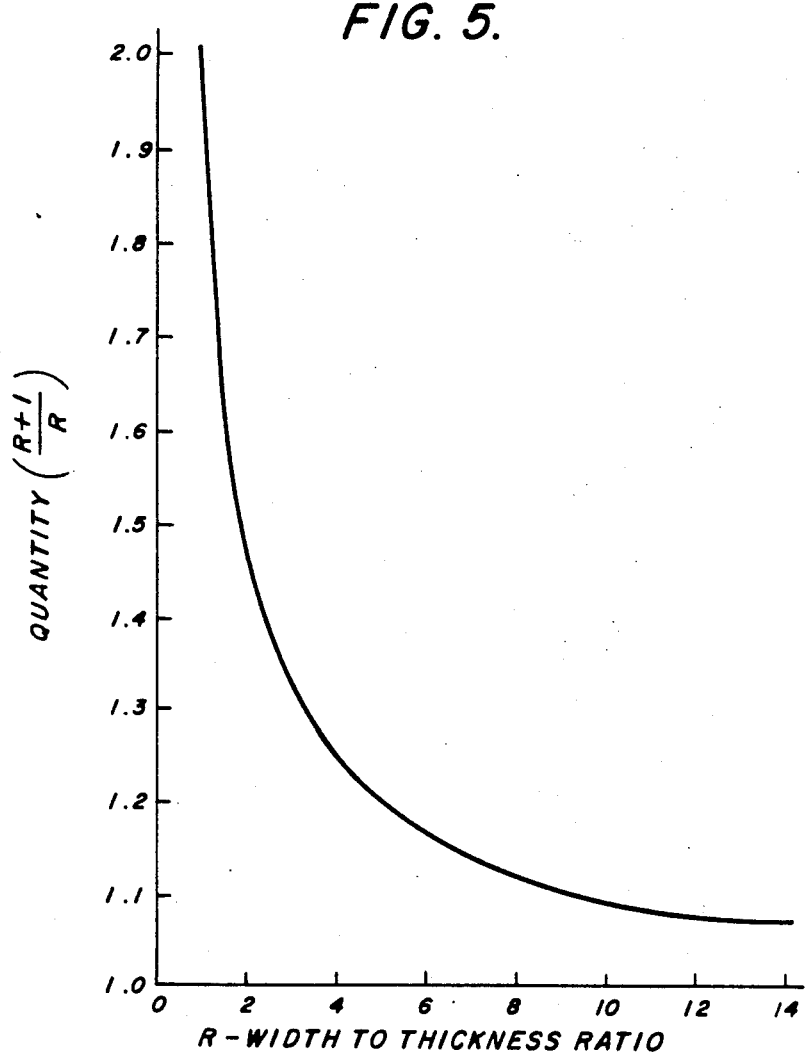
FIG. 5 is a grapth showing the effect of the width-to-thickness ratio on total surface area which in turn is related to strength improvement.

It can be seen from the equation described above that the total surface area $S_t$, is affected by three factors: (1) $p$, the percentage of the filaments in the concrete; (2) $t$, the thickness of the filament, and (3) R, the width-to-thickness ratio. Both the percentage of the filament in the concrete and the thickness of the filaments are linearly related to the total surface area. Increases in the percentage of filaments, $p$, will increase the total surface area, and decreases in the thickness $t$, will also increase the total surface area. However, the width-to-thickness ratio, R, is related to the total surface area in a manner which results in a critical value significantly affecting the total surface area. In Table V the relationship between R and the quantity $$\left(\frac{R+1}{R}\right)$$

as set forth in the aforementioned equation is described. This relationship is also shown in FIG. 5. Since the quantity $$\left(\frac{R+1}{R}\right)$$

is related to the total surface area and the total surface area in turn affects the strength improvement, it is seen therefore, that the width-to-thickness ratio R has a significant affect on the strength improvement. In this connection, it is well to review FIGS. 3 and 4 again which are graphs showing the relationship between ultimate tensile strength and total surface area for non-round and round filaments. These graphs are representative of the relationship defined and for different conditions of concrete, etc. Nevertheless, it is clearly shown that the ultimate tensile strength increases with total surface area/unit volume of matrix. The width-to-thickness ratio R has a clear effect on the total surface area, and as shown in FIG. 5, the total surface area is considerably greater when the width-to-thickness ratio is less than about 5–6 than it is when the ratio is greater than this quantity. The change in the width-to-thickness ratio from about 5 toward 1 results in a materially greater total surface area as illustrated by the affect of the width-to-thickness ratio of R on the quantity $$\left(\frac{R+1}{R}\right)$$

as shown in FIG. 5.

TABLE V

Relationship between R and the quantity $\left(\frac{R+1}{R}\right)$

R:
| | $\left(\frac{R+1}{R}\right)$ |
|---|---|
| 14 | 1.071 |
| 13 | 1.077 |
| 12 | 1.083 |
| 11 | 1.091 |
| 10 | 1.100 |
| 9 | 1.111 |
| 8 | 1.125 |
| 7 | 1.143 |
| 6 | 1.166 |
| 5 | 1.200 |
| 4 | 1.250 |
| 3 | 1.333 |
| 2 | 1.500 |
| 1 | 2.000 |

COATING APPARATUS

Figure 6:
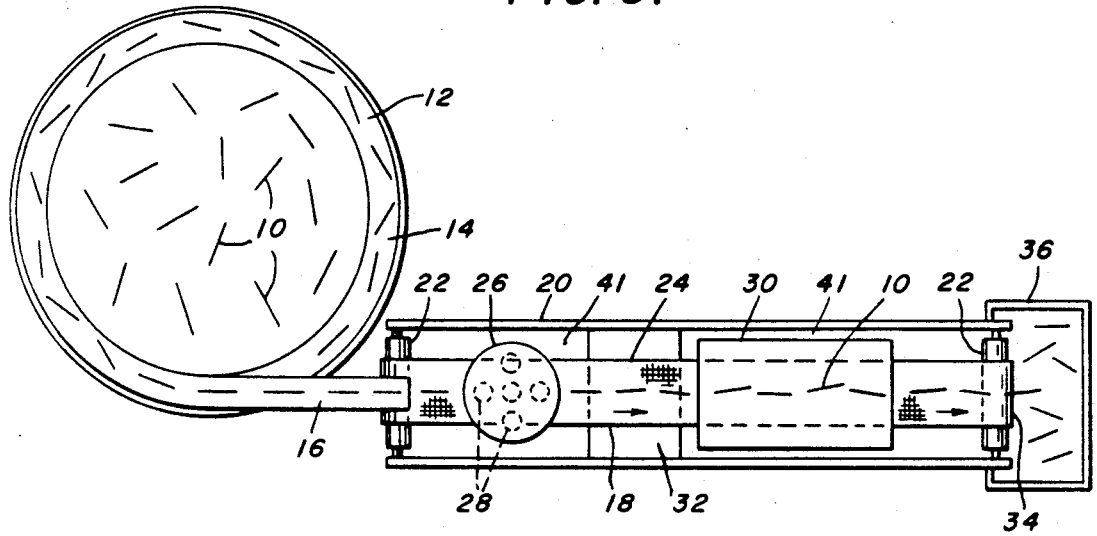
FIG. 6 is a plan diagrammatic-type view of one form of an apparatus for coating the discontinuous reinforcing filaments of the present invention with a protective coating and shows a vibratory feeder for sorting the filaments into a single line of filaments and a conveyor for transporting the single line of filaments along a path of movement through a spraying means and a drying means to a container where the coated dried filaments are collected.

The discontinuous reinforcing filaments 10 (FIG. 6) are piled in the bottom of a vibratory feeder 12 of the type shown in U.S. Pat. No. 2,654,465 issued to M. T. Sgriccia on Oct. 6, 1953. The filaments 10 are aligned in single file on the helical channel 14 (FIG. 6) and are vibrated upwardly in a path of movement from the bottom of the vibratory feeder 12 to a discharge chute 16 on the top of the vibratory feeder 12. As shown in FIG. 6, the filaments 10 are deposited on a conveyor 18. This conveyor 18 has a frame 20 (FIG. 6) in which are journaled a pair of rollers 22 for supporting a mesh-type endless conveyor belt 24 which is driven by conventional means (not shown) along the path of movement of the arrows in FIG. 6. The conveyor 18 transports the single line of filaments 10 past a spraying means, suitably a tank 26 (FIG. 6) containing the coating liquid 41 and provided with a plurality of spraying nozzles 28 adapted to cover the entire width of the mesh-type conveyor belt 24.

After coating, the filaments 10 (FIG. 6) are transported to a heating or drying means, such as an oven 30 of the electric or gaseous type or the like, where the coating 41 on the filaments 10 is dried. For the purpose of assuring that the filaments 10 will turn as they progress along their path of movement along the conveyor belt 24, the frame 20 of the conveyor is mounted on a vibrator 32 (FIG. 6). The coated dried filaments 10 fall from the discharge end 23 of the conveyor 18 into a collecting container 36.

Figure 7:
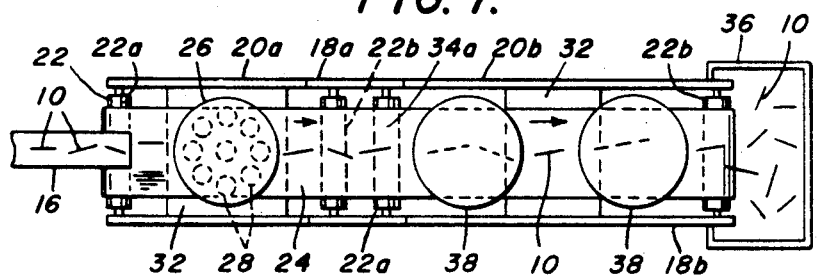
FIG. 7 is a view similar to FIG. 6 of an alternative embodiment of such coating apparatus and showing a spray conveyor for conveying the single line of filaments past a spraying means and a second or drying conveyor for conveying the sprayed filaments past a drying or heating means and for depositing the coated dried filaments into the container.

In FIG. 7, the filaments 10 are transported along the spraying conveyor 18a having a mesh-type belt 24 and fall from the discharge end 34a of the spraying conveyor 18a into a drying conveyor 18b. The drying conveyor 18b (FIG. 7) transports the coated filaments 10 along a heating means, in this case, a plurality of heating lamps 38, to the container 36.

Figure 9:
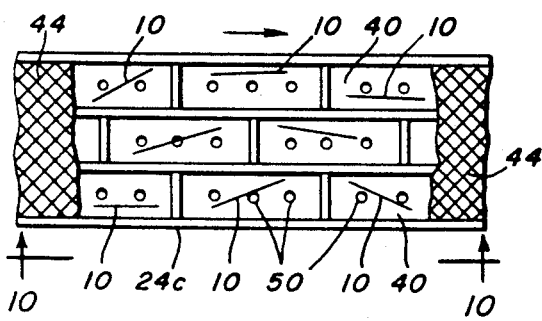
FIG. 9 is a fragmentary plan view of the stationary screen and conveyor belt taken along the line 9—9 of FIG. 8 in the direction of the arrows.
Figure 10:
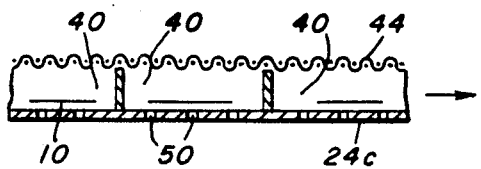
FIG. 10 is a fragmentary side elevational view of the conveyor belt and stationary screen taken along the line 10—10 of FIG. 9 in the direction of the arrows.
Figure 8:
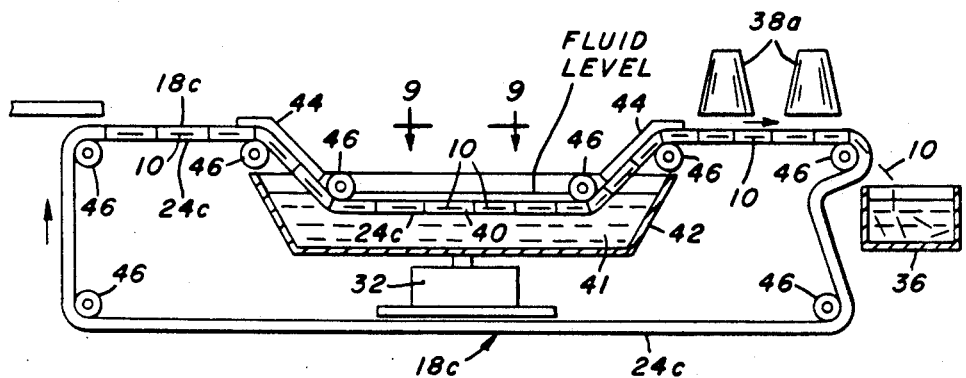
FIG. 8 is a diagrammatic side elevational view of a coating apparatus and showing a conveyor for conveying the filaments into a dipping tank containing the coating solution and a stationary screen disposed along the path of movement of the conveyor through the dipping tank for retaining the filaments within the compartmentalized conveyor belt.

Alternatively, as shown in FIGS. 8, 9, 10, the conveyor 18c may be provided with a compartmentalized belt 24c which belt 24c transports the filaments 10, one in each compartment 40 of the belt 24, into a dipping tank 42 containing the coating fluid 41. For the purpose of restraining the filaments 10 within the compartments 40 on the compartmentalized belt 24c, a stationary screen 44 (FIGS. 8–10) is disposed along the path of movement of the compartmentalized belt 24c through the dipping tank 42. The coated filaments 10 contained within the compartments 40 are then transported by the conveyor 18c along heating means, such as the heating lamps 38a (FIG. 8) and the dried coated filaments and are dropped into the container 36. As shown in FIG. 8, the conveyor belt 24c of the conveyor 18c is guided along its path of movement by a plurality of rollers 46. Holes 50 (FIGS. 9, 10) in each compartment 40 permit the coating fluid 41 to drain therefrom.

Data for FIGS. 1, 2, 3, 4

TABLE V-A

Bound filaments for figures 1, 2, 4, 12

| Filament size, inch | Diameter, inch | Percentage of steel by volume of concrete | Spacing, inch | Total surface area, sq. in. | Ultimate stress, p.s.i. | Strength ratio [1] |
|---|---|---|---|---|---|---|
| 0.017 | 5/8 | 0.76 | 0.269 | 1.80 | 467 | 1.10 |
| 0.017 | 1 1/2 | 0.76 | 0.269 | 1.80 | 491 | 1.15 |
| 0.017 | 3/8 | 0.76 | 0.269 | 1.80 | 520 | 1.22 |
| 0.017 | 1/2 | 0.83 | 0.257 | 1.97 | 425 | 1.00 |
| 0.017 | 1/2 | 0.83 | 0.257 | 1.97 | 462 | 1.08 |
| 0.025 | 3/8 | 1.25 | 0.309 | 2.00 | 414 | 0.97 |
| 0.017 | 1/2 | 0.94 | 0.242 | 2.22 | 458 | 1.08 |
| 0.017 | 5/8 | 1.25 | 0.210 | 2.95 | 420 | 0.99 |
| 0.017 | 5/8 | 1.25 | 0.210 | 2.95 | 489 | 1.15 |
| 0.025 | 5/8 | 2.25 | 0.230 | 3.61 | 478 | 1.12 |
| 0.025 | 3/8 | 2.50 | 0.218 | 4.03 | 475 | 1.12 |
| 0.025 | 1 1/2 | 2.50 | 0.218 | 4.03 | 634 | 1.49 |
| 0.017 | 1/2 | 2.04 | 0.164 | 4.83 | 602 | 1.41 |
| 0.017 | 3/8 | 2.15 | 0.160 | 5.08 | 568 | 1.33 |
| 0.017 | 5/8 | 2.25 | 0.156 | 5.35 | 509 | 1.19 |
| 0.017 | 5/8 | 2.25 | 0.156 | 5.35 | 551 | 1.29 |
| 0.025 | 5/8 | 3.41 | 0.187 | 5.46 | 478 | 1.12 |
| 0.025 | 3/8 | 3.76 | 0.178 | 6.03 | 500 | 1.17 |
| 0.0065 | 1/2 | 1.00 | 0.090 | 6.14 | 619 | 1.45 |
| 0.017 | 1/2 | 3.12 | 0.133 | 7.34 | 565 | 1.33 |
| 0.017 | 5/8 | 3.31 | 0.129 | 7.83 | 591 | 1.39 |
| 0.017 | 5/8 | 3.53 | 0.125 | 8.33 | 616 | 1.45 |
| 0.025 | 3/8 | 5.22 | 0.151 | 8.39 | 571 | 1.34 |
| 0.017 | 5/8 | 3.75 | 0.121 | 8.90 | 631 | 1.48 |
| 0.017 | 5/8 | 4.16 | 0.115 | 9.85 | 643 | 1.51 |
| 0.017 | 5/8 | 4.35 | 0.112 | 10.40 | 603 | 1.42 |
| 0.017 | 5/8 | 4.74 | 0.108 | 11.11 | 648 | 1.52 |
| 0.0065 | 1/2 | 2.04 | 0.063 | 12.42 | 658 | 1.54 |
| 0.017 | 5/8 | 5.83 | 0.097 | 13.83 | 604 | 1.42 |
| 0.017 | 3/8 | 5.83 | 0.097 | 13.83 | 640 | 1.50 |
| 0.017 | 3/8 | 6.25 | 0.094 | 14.77 | 664 | 1.56 |

[1] Ratio of the ultimate strength of filament reinforced concrete to the ultimate strength of plain unreinforced concrete.

NOTE.—Average ultimate strength of the 40 plain specimens=426 p.s.i.

TABLE VI

Flat filaments for Figures 1, 2, 3, 12

| Filament size, inch | Percentage of steel by volume of concrete | Spacing, inch | Total surface area, sq. in | Ultimate stress, p.s.i. | Strength ratio [1] |
|---|---|---|---|---|---|
| 0.015×0.125×1.00 | 1.50 | 0.551 | 2.240 | 452 | 1.27 |
| 0.015×0.125×1.00 | 1.50 | 0.551 | 2.240 | 478 | 1.34 |
| 0.015×0.094×1.00 | 1.50 | 0.478 | 2.318 | 491 | 1.38 |
| 0.014×0.150×1.00 | 1.50 | 0.583 | 2.343 | 478 | 1.33 |
| 0.014×0.150×1.00 | 1.50 | 0.583 | 2.343 | 510 | 1.44 |
| 0.015×0.063×1.00 | 1.50 | 0.391 | 2.475 | 545 | 1.53 |
| 0.015×0.063×1.00 | 1.50 | 0.391 | 2.475 | 558 | 1.58 |
| 0.014×0.030×1.00 | 1.50 | 0.261 | 3.146 | 669 | 1.88 |
| 0.010×0.094×1.00 | 1.50 | 0.390 | 3.319 | 518 | 1.46 |
| 0.015×0.125×1.00 | 2.50 | 0.427 | 3.733 | 545 | 1.53 |
| 0.015×0.094×1.00 | 2.50 | 0.371 | 3.862 | 500 | 1.40 |
| 0.014×0.150×1.00 | 2.50 | 0.452 | 3.905 | 481 | 1.35 |
| 0.010×0.030×1.50 | 1.50 | 0.221 | 4.000 | 605 | 1.70 |
| 0.010×0.030×1.50 | 1.50 | 0.221 | 4.000 | 620 | 1.74 |
| 0.015×0.063×1.00 | 2.50 | 0.303 | 4.125 | 598 | 1.68 |
| 0.015×0.063×1.00 | 2.50 | 0.303 | 4.125 | 602 | 1.69 |
| 0.014×0.081×1.00 | 2.50 | 0.326 | 4.215 | 666 | 1.87 |
| 0.014×0.081×1.00 | 2.50 | 0.326 | 4.215 | 692 | 1.94 |
| 0.014×0.081×1.00 | 2.50 | 0.326 | 4.215 | 711 | 2.00 |
| 0.015×0.125×1.00 | 3.50 | 0.361 | 5.225 | 580 | 1.63 |
| 0.015×0.094×1.00 | 3.50 | 0.313 | 5.408 | 584 | 1.64 |
| 0.014×0.027×1.00 | 2.50 | 0.192 | 5.424 | 759 | 2.13 |
| 0.015×0.063×1.00 | 3.50 | 0.256 | 5.775 | 646 | 1.81 |
| 0.010×0.030×1.50 | 2.50 | 0.171 | 6.667 | 669 | 1.88 |
| 0.010×0.030×1.50 | 2.50 | 0.171 | 6.667 | 690 | 1.94 |
| 0.010×0.022×1.00 | 2.50 | 0.146 | 7.273 | 735 | 2.06 |
| 0.010×0.022×1.00 | 2.50 | 0.146 | 7.273 | 877 | 2.46 |
| 0.014×0.030×1.00 | 3.50 | 0.171 | 7.340 | 708 | 1.99 |
| 0.014×0.030×1.00 | 3.50 | 0.171 | 7.340 | 765 | 2.15 |
| 0.010×0.030×1.00 | 3.50 | 0.144 | 9.333 | 855 | 2.40 |

[1] Ratio of the ultimate strength of filament reinforced concrete to the ultimate strength of plain unreinforced concrete.

NOTE.—Average ultimate strength of the 30 plain specimens=356 p.s.i.

TABLE VII

Plain Unreinforced Concrete Specimens

1. Ultimate strength (p.s.i.) of the plain concrete matrix—mixed with the round filaments.

| | | | |
|---|---|---|---|
| 364 | 411 | 356 | 357 |
| 409 | 425 | 466 | 378 |
| 434 | 495 | 406 | 430 |
| 328 | 389 | 397 | 416 |
| 480 | 507 | 449 | 425 |
| 516 | 441 | 471 | 478 |
| 436 | 395 | 436 | 363 |
| 434 | 489 | 416 | 477 |
| 356 | 457 | 444 | 430 |
| 386 | 380 | 468 | 386 |

Average=425.9 p.s.i.

TABLE VII—Continued

II. Ultimate strength (p.s.i.) of the plain concrete matrix—mixed with the flat filaments

| | | | |
|---|---|---|---|
| 354 | 354 | 633 | 376 |
| 385 | 354 | 305 | 296 |
| 336 | 332 | 345 | 336 |
| 425 | 296 | 292 | 345 |
| 411 | 311 | 328 | 420 |
| 398 | 370 | 363 | 398 |
| 354 | 319 | 425 | |
| 350 | 327 | 425 | |

Average=356.4 p.s.i.

STEEL-FILAMENT REINFORCED PLASTICS

The plastic matrix mass may employ any of the following plastics or their equivalents:

(a) High-density polyethylene, such as Martex 6009 from Phillips Petroleum Company, Bartleesville, Okla., or the like;

(b) Polystyrene such as Pylene-GP from Koppers Company, Inc., Pittsburgh, Pa., or the like;

(c) Unsaturated polyester resin such as KOPLAC 1100–10 from Koppers Company, Inc., Pittsburgh, Pa., or the like;

(d) Epoxy resin, such as ERL-2795, ERL-2256, ERLA-4305 from Union Carbide Company, New York, N.Y., or the like.

Matrix material was a high-density polyethylene, Martex 6009, from Phillips Petroleum Company or the like.

The samples were compression-molded in a 9 by 9 by ⅛ inch cavity mold on an electrically heated, water-cooled hydraulic press. The steel filaments were randomly placed in the cavity mold, which was coated with a suitable release agent, such as Garan 225 made by Ram Chemical Co., Gardena, Calif., or the like. Then the polyethylene was placed in the mold and the composite was molded at conditions (such as a temperature of about 350° F. or the like) suitable for the plastic to wet-out and fill all of the voids in the mold. The composite was cooled under pressure such as about 1000 p.s.i. or the like to about ambient temperature in the press before removal.

The samples were tested according to ASTM Test Method D 638–61T, "Tentative Method of Test for Tensile Properties of Plastics" except that the sample size was about 6 by ½ by ⅛ inch. The tensile tests were run at about a 2 inch per minute ram speed.

The results of a number of tests conducted as described above are given in Table VIII (below). The strengthening effect of the flat filaments is shown in FIG. 11. FIG. 11 illustrates that the ultimate tensile strength of the flat filament reinforced plastic increases as the total surface area of filaments increases.

TABLE VIII

For Figure 11 (Flat filaments)

| Filament size, inches | Total surface area, sq. in. | Percent of steel filaments by volume of plastic | Ultimate strength (p.s.i.) |
|---|---|---|---|
| 0.014×0.027×1.00 | 23.7 | 10.9 | 2,200 |
| 0.014×0.027×1.00 | 23.7 | 10.9 | 3,400 |
| 0.014×0.027×1.00 | 23.7 | 10.9 | 3,890 |
| 0.010×0.022×1.00 | 31.7 | 10.9 | 3,315 |
| 0.010×0.022×1.00 | 31.7 | 10.9 | 3,260 |
| 0.010×0.022×1.00 | 31.7 | 10.9 | 3,160 |
| 0.006×0.016×0.50 | 71.0 | 15.5 | 2,960 |
| 0.006×0.016×0.50 | 71.0 | 15.5 | 3,220 |
| 0.006×0.016×0.50 | 71.0 | 15.5 | 3,070 |
| 0.006×0.016×1.00 | 34.4 | 7.5 | 2,870 |
| 0.006×0.016×1.00 | 34.4 | 7.5 | 3,100 |
| 0.006×0.016×1.00 | 34.4 | 7.5 | 3,280 |
| 0.006×0.016×1.00 | 34.4 | 7.5 | 3,620 |
| 0.006×0.016×1.00 | 34.4 | 7.5 | 3,050 |
| 0.006×0.016×1.00 | 34.4 | 7.5 | 3,050 |
| 0.006×0.016×0.50 | 34.4 | 7.5 | 3,660 |
| 0.006×0.015×0.37 | 50.9 | 10.9 | 4,380 |
| 0.002×0.002×0.75 | 218.0 | 10.9 | 6,100 |
| 0.002×0.002×0.75 | 218.0 | 10.9 | 6,215 |
| 0.002×0.002×0.75 | 218.0 | 10.9 | 6,210 |
| 0.002×0.002×1.00 | 218.0 | 10.9 | 5,850 |
| 0.002×0.002×1.00 | 218.0 | 10.9 | 5,840 |
| 0.002×0.002×1.00 | 218.0 | 10.9 | 6,510 |
| 0.002×0.002×1.00 | 218.0 | 10.9 | 5,945 |
| 0.002×0.002×1.00 | 218.0 | 10.9 | 6,080 |
| 0.014×0.027×1.00 | 6.5 | 3.0 | 2,670 |
| 0.014×0.027×1.00 | 6.5 | 3.0 | 2,720 |
| 0.014×0.027×1.00 | 6.5 | 3.0 | 2,560 |
| 0.014×0.027×1.00 | 6.5 | 3.0 | 2,580 |
| 0.014×0.027×1.00 | 6.5 | 3.0 | 2,400 |
| 0.014×0.027×1.00 | 6.5 | 3.0 | 2,520 |
| 0.014×0.027×1.00 | 6.5 | 3.0 | 2,940 |
| 0.014×0.027×1.00 | 16.3 | 7.5 | 3,055 |
| 0.014×0.027×1.00 | 16.3 | 7.5 | 2,490 |
| 0.014×0.027×1.00 | 16.3 | 7.5 | 2,810 |
| 0.014×0.027×1.00 | 16.3 | 7.5 | 3,020 |
| 0.014×0.027×1.00 | 16.3 | 7.5 | 3,385 |
| 0.014×0.027×1.00 | 16.3 | 7.5 | 2,845 |
| 0.014×0.027×1.00 | 16.3 | 7.5 | 3,370 |
| 0.014×0.027×1.00 | 23.7 | 10.9 | 3,100 |
| 0.014×0.027×1.00 | 23.7 | 10.9 | 2,960 |
| 0.014×0.027×1.00 | 23.7 | 10.9 | 2,995 |
| 0.014×0.027×1.00 | 23.7 | 10.9 | 3,410 |
| 0.014×0.027×1.00 | 33.6 | 15.5 | 2,720 |
| 0.002×0.002×1.00 | 150.0 | 7.5 | 5,305 |
| 0.002×0.002×1.00 | 150.0 | 7.5 | 4,725 |

TABLE VIII—Continued

For Figure 11 (Flat filaments)

| Filament size, inches | Total surface area, sq. in. | Percent of steel filaments by volume of plastic | Ultimate strength (p.s.i.) |
|---|---|---|---|
| 0.002×0.002×1.00 | 150.0 | 7.5 | 5,350 |
| 0.002×0.002×1.00 | 150.0 | 7.5 | 4,650 |
| 0.002×0.002×1.00 | 218.0 | 10.9 | 5,840 |
| 0.002×0.002×1.00 | 218.0 | 10.9 | 6,510 |
| 0.002×0.002×1.00 | 218.0 | 10.9 | 5,850 |
| 0.002×0.002×1.00 | 218.0 | 10.9 | 5,945 |
| 0.002×0.002×1.00 | 218.0 | 10.9 | 6,080 |
| 0.002×0.002×1.00 | 310.0 | 15.5 | 7,460 |
| 0.002×0.002×1.00 | 310.0 | 15.5 | 8,050 |
| 0.002×0.002×1.00 | 310.0 | 15.5 | 7,800 |
| 0.002×0.002×1.00 | 310.0 | 15.5 | 7,830 |
| 0.002×0.002×1.00 | 536.0 | 26.8 | 11,620 |
| 0.002×0.002×1.00 | 536.0 | 26.8 | 11,350 |
| 0.002×0.002×1.00 | 536.0 | 26.8 | 11,900 |

STEEL FILAMENT REINFORCED REFRACTORIES

The refractory matrix mass may employ any of the following refractories or their equivalents:

(a) Type H & HS refractory made by Harbison-Walker Refractories, Pittsburgh, Pa. 15222;

(b) Type Hydro Mix. Plicast, Hearth Cement, or Plibrico #27 refractories made by Plibrico Company, Chicago, Ill. 60614;

(c) Type Brickcast Extra HS refractory made by General Refractories Company, Philadelphia, Pa. 19102;

(d) Type Butler 2300° F. refractory made by Butler Refractories Division of Ferroslag Process Corp., Butler, Pa. 16001; and (e) Type KastSet refractory made by A & P Green Refractories, Mexico, Mo.

The filaments 10 may be formed of carbon steel or stainless steel, such as T-304, T-316 or the like for high temperature use.

Refractory matrices are usually of a refractory cement base, such as Lumnite Cement, the trade name for a high alumna cement made by United States Steel Corporation, Pittsburgh, Pa. or the like. For this reason mixing procedures are about the same as those used for conventional mortar or concrete. For example, a paddle type mortar mixer (not shown) might be used in which all ingredients including the steel filaments are mixed and dispersed dry. Water is then added and mixed to a plastic castable consistency. Once the water is added, the chemical action begins and mixing time is held to a minimum, such as about 3 minutes, as Lumnite is a quick-setting cement. The mix is poured in place for example, as a liner for an open hearth furnace door (not shown) in which the door frames act as the mold and the reinforced refractory remains in place. When lining kilns, or the like, with the reinforced refractory, such refractory may be pneumatically placed by use of a conventional machine, such as Gunnite machine made by Allentown Pneumatic Gun Co., Allentown, Pa. 18105 or the like, and by following practices outlined in the American Concrete Institute's symposium on shot-creting publication SP-14, American Concrete Institute, Detroit, Mich. 48219.

STEEL FILAMENT REINFORCED RUBBER

The rubber matrix mass may employ any of the following elastomers or their equivalent:

(a) Polyisoprene rubber from Shell Chemical Corporation, Synthetic Rubber Division, Torrance, Calif. 90502;

(b) Neoprene W rubber from E. I. du Pont de Nemours and Company, Inc., Wilmington, Del. 19393;

(c) Butadiene-styrene, such as Plioflex 150–2 or the like, from Goodyear Tire and Rubber Company, Akron, Ohio 44315;

(d) Natural rubber; and (e) Thermoset chemically cross linked polyethylene.

The rubber formulations or ingredients, such as latex (rubber), kaolin filler clay, extenders such as Shellflex oil based extender made by Shell Chemical Corp., Torrance, Calif. 90502, etc. are compounded or mixed using an internal rubber mill such as a Banbury mixer made by Farrel Co., Division of United Shoe Machinery Co., Ansonia, Conn. or the like, and filaments 10 are added during this operation. The milled material having a high viscosity yet plastic-like consistency is placed in a closed mold (not shown) under pressure. Relatively low pressures, such as about 100 p.s.i. or the like are usually sufficient to provide flow of the material so as to completely fill out the mold. Generally fluid pressures, such as about 100 p.s.i. or the like, are used at elevated temperatures, such as about 300° F. or the like, thus obtaining both pressure to fill out the mold and heat for vulcanizing. Vulcanising is done by heating quite generally with steam or low melting point metals, such as Woods Metal or the like, at a temperature of about 300° F. Steel filaments 10 used in these matrices will usually be brass plated. The brass chemistry being about 65 to 75 percent copper with a corresponding zinc content of about 35 to 25 percent. After vulcanizing the filament reinforced product is ready for use. Such a product exhibits improved wear characteristics, increased heat conductivity and resistance to failure to propagating cracks in the rubber.

FILAMENT REINFORCED BITUMINOUS MATERIAL COAL TAR OR ASPHALTIC VEHICLES

It is possible and feasible to introduce into bituminous mixes filaments and/or acidular fillers such as sand, gravel or the like. Batch mixing by stirring is preferred and depending on viscosity, may require elevated temperatures, such as about 200° F. or the like.

The properties of filaments reinforced bituminous, coal tar or asphaltic materials mixed will be enhanced for many uses. The rheological or flow property as measured by conventional rotational and/or orifice type viscosimeters will increase with increases in percent by volume of filaments added.

Another measure of the increased stabiltiy of a filament reinforced bituminous mix is the inclined plane flow test wherein a briquet of material is placed on about a 45 degree incline at about 120° F. for about 1 hour. A non-stabilized product would flow or run on this incline whereas with filament additives, flow, slump or run is inhibited. This flow is an inverse function of the amount of filaments 10 added.

Stabilized bituminous products are used to advantage in road construction as base, intermediate, and wearing layers, in roofing pitches, asphaltic drainage ditches, and canal linings and for grouting and joint sealing. With the use of copper filaments 10 in the mix, an efficient antifouling coating for boats and ships is made.

STEEL FILAMENT REINFORCED WOOD PRODUCTS BOARD

As a means of strengthening as well as of providing magnetic wood products, particle or flake board, steel filaments 10 are introduced in the manufacturing process. For example, raw wood, such as Aspen wood or the like is peeled with the grain in a manner so as to provide "flakes" of wood. The flakes are then kiln dried to about 5 percent moisture content. The flakes are spread out on a moving belt at which time steel filaments 10 are introduced in a completely random manner so as to be dispersed throughout the flakes. The flakes and precoated filaments 10 (by an epoxy-resin adhesive 41 of the type hereinafter disclosed) are sprayed with a resin binder such as Casco resin type WW-17 made by Bordon, Inc., Chemical Division, New York, N.Y. 10017 or the like. The flakes and filaments 10 are then metered into cauls (trays) to a depth of about 8 inches, which depth depends on the required final board thickness. These trays are stacked in a forming press having steam heated platens. The stacks of trays are hydraulically loaded under pressure and heated for about 20 minutes during which time the 8" height is compressed to about ¾ inch. The resin provides bond between flakes and filaments 10. The boards, usually about 4' by 16', are taken from the trays, trimmed and sanded and are ready for shipment.

FILAMENT COATINGS

It is expected that in specific cases steel filaments 10 will be pre-coated with different materials depending on which matrix material is being combined with the filaments 10.

For refractories, concretes and other cement based matrices, the filaments 10 can be coated with liquid type coating fluid 41 (FIG. 8), such as Epoxy Resin Adhesives (SIKA Chemical Corp., Passiac, N.J.), Rust Arrest 36, an organic phosphatic resin made by Lubrizol Corporation, Wickliffe, Ohio 44092, U.S. Steel Nexus SX9003 or PX2001 (U.S. Steel Corp., Pittsburgh, Pa.) or the like.

Brass coated steel filaments 10 would be used in rubber compounds. The purpose of all of these coatings 41 is to increase the interfacial shear strength between the filament 10 and the matrix and thus enhance the strength and flow properties of the matrix, and to protect the filaments 10, formed of aluminum, glass fiber and the like, from chemical attack by the matrix material.

FIGURE 12

In summary, FIG. 12 further illustrates the performance of the flat filaments 10 over round filaments. FIG. 12 shows how an increase in the total surface area of the flat filaments 10 provide a much greater strengthening effect than a comparable increase in total surface area of round filaments. The strengthening effect of the filaments, both round and flat, is expressed in FIG. 12 as a ratio of the ultimate strength of the filament reinforced concrete to the ultimate strength of the plain concrete. The data shown in FIG. 12 is presented in Tables V–A and VI.

SUMMARY OF THE ACHIEVEMENTS OF THE INVENTION

Other advantages accrue from the use of non-round filaments in accordance with the invention in addition to the strength improvement over round fibers. Thus, for example, it has been found that by mixing non-round filaments into concrete such filaments have a tendency to mix more thoroughly with a resultant more uniform distribution throughout the concrete, whereas round filaments have a tendency to ball or form localized concentration zones. Further, non-round filaments can be mixed into concrete equally well either before or after water is added to the mix, whereas round fibers may be distributed properly when mixed wet, but often cannot be distributed uniformly when mixed dry before adding water. In the latter situation, the round filaments, when added to a dry mix to which water is then added, generally showed local concentrations and in many cases the wires clustered or failed to disperse properly throughout the mixture.

Thus, one aspect of the present invention is a novel method of making filament reinforced concrete by preparing a dry admixture of cement, aggregate (sand and/or coarse aggregate) and the non-round reinforcing filaments in accordance with the invention and described previously. The substantially dry admixture should properly be mixed to randomly distribute the filaments after which at least sufficient water is added for hydration of the cement and the entire mixture then remixed. The dry admixture may be alternatively transported to the work site where it is mixed with water or water and admixture may be mixed in transport as is conventional concrete. Also, the filament reinforced concrete may be placed by pneumatic pressure by techniques sometimes referred to as "shot creting." In the latter instance, dry or water-containing mixtures are pneumatically "shot" through a nozzle.

We have also found that fibers of a material having a relatively high modulus of elasticity will strengthen the concrete the most at a given strain. The greater the modulus, the greater the stress which can be built up in the reinforcing. Thus, for example, fibers of steel, with a modulus ratio to concrete of 10:1, will be able to improve the strength of concrete more than fibers of aluminum which have a 3:1 modulus ratio to concrete, assuming equivalent concrete-to-fiber bonding. In this latter connection, it is noted that the use of both coated and uncoated fibers are within the purview of the present invention. Moreover, the fibers may be made of a variety of material including, for example, fiber glass, nylon, plastics and other synthetics as well as various metals, e.g. titanium, tungsten, copper, lead, stainless, steel, aluminum, etc. The material selection depends upon the strength and other properties desired to be developed in the concrete. However, in accordance with the invention, whatever fiber materials are employed, the non-round configuration and their distribution within the concrete mortar will result in greater strength improvement.

In accordance with the invention, the reinforcing fibers may be used as the exclusive reinforcing agent in the concrete or in conjunction with other reinforcement. Thus, for example, the concrete may be reinforced with mesh and/or bars in conventional fashion and additionally with non-round filaments. In all cases, the discontinuous reinforcing, i.e. filaments as opposed to rod, bar or mesh, shall consist of non-round fibers as discussed above.

It is apparent from the above that various changes and modifications may be made without departing from the invention. Accordingly, the scope thereof should be limited only by the appended claims wherein what is claimed is:

1. A reinforced composite comprising:
   (a) one castable matrix mass from the group consisting of a castable concrete matrix mass and a castable plain mortar matrix mass where said castable concrete matrix mass and said castable plain mortar matrix mass contain portland cement, a castable plastic matrix mass, a castable rubber matrix mass, a castable refractory matrix mass, a castable asphalt matrix mass, and a castable fiber matrix mass;
   (b) one plurality of discontinuous coated or uncoated reinforcing filaments from one group consisting of discontinuous fiber glass reinforcing filaments, discontinuous nylon reinforcing filaments, discontinuous titanium reinforcing filaments, discontinuous tungsten reinforcing filaments, discontinuous copper reinforcing filaments, discontinuous lead reinforcing filaments, discontinuous aluminum reinforcing filaments, and discontinuous steel reinforcing filaments randomly distributed within said matrix mass in sufficient quantity to reinforce said matrix mass and restrict crack propagation,
      (1) said filaments being bonded to said matrix mass,
      (2) substantially all of said discontinuous filaments in said matrix mass having a non-round cross-sectional configuration having a width dimension and a thickness dimension, and a width-to-thickness ratio of not greater than about five,
      (3) said width dimension being in the range of about 0.005 to 0.15 inch,
      (4) said thickness dimension being in the range of about 0.001 to 0.03 inch,
      (5) said filaments having a length of about ¼ to 3 inches, and
      (6) where the percentage of said filaments in a unit volume of said matrix mass is in the range of about 0.33 to 26.8 percent.

2. A method of manufacturing a reinforced composite comprising:
   (a) casting one castable matrix mass from the group consisting of a castable concrete matrix mass and a castable plain mortar matrix mass wherein said castable concrete matrix mass and said castable plain mortar matrix mass contain portland cement, a castable plain mortar matrix mass, a castable rubber matrix mass, a castable refractory matrix mass, a castable asphalt matrix mass, and a castable fiber matrix mass;
   (b) admixing one plurality of coated or uncoated discontinuous reinforcing filaments from the group consisting of discontinuous fiber glass reinforcing filaments, discontinuous nylon reinforcing filaments, discontinuous titanium reinforcing filaments, discontinuous tungsten reinforcing filaments, discontinuous copper reinforcing filaments, discontinuous lead reinforcing filaments, discontinuous aluminum reinforcing filaments, and discontinuous steel reinforcing filaments randomly within said matrix mass in sufficient quantity to reinforce said matrix mass and restrict crack propagation;
      said filaments having a non-round cross-sectional configuration width dimension of about 0.005 to 0.15 inch and a thickness dimension of about 0.001 to 0.03 inch, a length of about ¼ to 3 inches, a width-to-thickness ratio of not greater than about five, and a percentage of such filaments in a unit volume of said matrix mass in the range of about 0.33 to 26.8 percent.

References Cited
UNITED STATES PATENTS

| | | | |
|---|---|---|---|
| 2,780,889 | 2/1957 | Fulk | 106—97 |
| 3,062,670 | 11/1962 | Marzocchi et al. | 106—99 |
| 3,166,518 | 1/1965 | Barnard | 106—97 |

WILLIAM J. VAN BALEN, Primary Examiner

U.S. Cl. X.R.

161—179, 181

UNITED STATES PATENT OFFICE
CERTIFICATE OF CORRECTION

Patent No. 3,728,211  Dated April 17, 1973

Inventor(s) CLAIRE G. BALL, ET. AL.

It is certified that error appears in the above-identified patent and that said Letters Patent are hereby corrected as shown below:

Column 3, line 56, "grapth" should read -- graph -- . Column 4, line 15, "round" should read -- found -- . Column 6, in Table III, Group II should include four diameters (all 0.017) instead of the three presently listed and Group III should include only two diameters (both 0.025); in Table IV, the fourth number under the heading "Width, inch" should be -- 0.028 -- instead of "0.208". Column 8, line 48, "end 23" should read -- end 34 -- . Column 9, in Table V-A, in the title, "Bound" should read -- Round -- ; in Table VI, under the heading "Strength ratio$^1$", the fourth number should be -- 1.34 -- instead of "1.33" and the fifth number should be -- 1.43 -- instead of "1.44"; in Table VII, in the first column, the fourth number should be -- 382 -- instead of "328". Column 10, in Table VII--Continued, in the third column, the first number should be -- 363 -- instead of "633". Column 11, line 2, "Bartleesville" should read -- Bartlesville -- ; in Table VIII, under the heading "Ultimate strength (p.s.i.)" the fifteenth number should be -- 2,660 -- instead of "3,050"; delete entire line 16. Column 12, line 22, "H & HS" should read -- H & W HS --. Column 13, line 12, "Vulcanising" should read -- Vulcanizing -- ; line 22, "to" should be -- by -- ; line 37, "stabiltiy" should read -- stability -- . Column 16, under claim 2, in the eighth line of the claim, "plain mortar" should read -- plastic -- .

Signed and sealed this 20th day of November 1973.

(SEAL)
Attest:

EDWARD M. FLETCHER, JR.
Attesting Officer

RENE D. TEGTMEYER
Acting Commissioner of Patents